United States Patent
Song et al.

(10) Patent No.: US 10,619,575 B2
(45) Date of Patent: Apr. 14, 2020

(54) APPARATUS AND METHOD FOR CONTROLLING VARIABLE COMPRESSION RATIO ENGINE

(71) Applicants: HYUNDAI MOTOR COMPANY, Seoul (KR); KIA MOTORS CORPORATION, Seoul (KR)

(72) Inventors: Jae Hyeok Song, Busan (KR); Hyunsung Jung, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/194,766

(22) Filed: Nov. 19, 2018

(65) Prior Publication Data
US 2019/0309691 A1 Oct. 10, 2019

(30) Foreign Application Priority Data
Apr. 6, 2018 (KR) .......... 10-2018-0040074

(51) Int. Cl.
*F02D 13/02* (2006.01)
*F02D 15/02* (2006.01)
(Continued)

(52) U.S. Cl.
CPC .......... *F02D 13/02* (2013.01); *B60W 20/13* (2016.01); *F02B 75/048* (2013.01); *F02D 15/02* (2013.01); *F02D 29/02* (2013.01); *F02D 41/1497* (2013.01); *F02D 2200/021* (2013.01); *F02D 2200/023* (2013.01); *F02D 2200/101* (2013.01); *F02D 2200/1002* (2013.01); *F02D 2200/503* (2013.01); *F02D 2250/18* (2013.01); *F02D 2250/21* (2013.01); *F02D 2700/03* (2013.01)

(58) Field of Classification Search
CPC .......... F02D 13/02; F02D 15/00; F02D 15/02; F02D 15/04; F02D 2200/021; F02D 2200/023; F02D 2200/503; F02D 29/02; F02D 41/1497; F02B 75/048
See application file for complete search history.

(56) References Cited

U.S. PATENT DOCUMENTS

| 5,806,617 A | 9/1998 | Yamaguchi |
| 9,944,276 B2 | 4/2018 | Miller et al. |

(Continued)

FOREIGN PATENT DOCUMENTS

| DE | 102017109393 A1 | 11/2017 |
| EP | 1270879 A2 | 1/2003 |

OTHER PUBLICATIONS

Extended European Search Report of corresponding EP Patent Application No. 18206569.8—7 pages (dated Jun. 5, 2019).

*Primary Examiner* — Jacob M Amick
(74) *Attorney, Agent, or Firm* — Morgan, Lewis & Bockius LLP

(57) ABSTRACT

A variable compression ratio engine includes a piston reciprocally moving in a cylinder of an engine; a variable compression ratio apparatus controlling a movable range of the piston; and a controller controlling the variable compression ratio apparatus if a driving condition of a vehicle and a stability condition of the engine are satisfied to change a compression ratio and controlling a motor torque and an engine torque to control a requirement torque to be satisfied.

9 Claims, 5 Drawing Sheets

(51) Int. Cl.
   *F02B 75/04*   (2006.01)
   *F02D 29/02*   (2006.01)
   *B60W 20/13*   (2016.01)
   *F02D 41/14*   (2006.01)

(56) References Cited

U.S. PATENT DOCUMENTS

| | | |
|---|---|---|
| 2004/0153234 A1 | 8/2004 | Mogi et al. |
| 2012/0136551 A1* | 5/2012 | Irisawa ............... F02D 13/0234 701/102 |
| 2014/0137824 A1 | 5/2014 | Jacques et al. |

* cited by examiner

APPARATUS AND METHOD FOR CONTROLLING VARIABLE COMPRESSION RATIO ENGINE

CROSS-REFERENCE TO RELATED APPLICATION

This application claims priority to and the benefit of Korean Patent Application No. 10-2018-0040074 filed in the Korean Intellectual Property Office on Apr. 6, 2018, the entire contents of which are incorporated herein by reference.

BACKGROUND

(a) Field

The present disclosure relate to an apparatus and a method for controlling a variable compression ratio engine.

(b) Description of the Related Art

In general, the thermal efficiency of heat engines increases when the compression ratio is high, and in spark ignition engines, the thermal efficiency increases when the ignition timing is advanced up to a predetermined level. However, when the ignition timing is advanced with a high compression ratio in the spark ignition engines, abnormal combustion is generated, and the engines may be damaged, so that there is a limit in advance of the ignition timing and accordingly the output is necessarily reduced.

A variable compression ratio (VCR) apparatus is an apparatus that changes the compression ratio of a gas mixture in accordance with the operation state of an engine. In variable compression ratio engines that can vary varies the compression ratio, it is possible to improve the fuel efficiency by increasing the compression ratio of a gas mixture under a low load condition. Variable compression ratio engines can prevent or minimize knocking and improve the output by reducing the compression ratio of the gas mixture under a high load condition.

The above information disclosed in this Background section is only for enhancement of understanding of the background of the invention and therefore it may contain information that does not form the prior art that is already known in this country to a person of ordinary skill in the art.

SUMMARY

One aspect of the present invention provides an apparatus and a method for controlling a variable compression ratio engine for solving the anxiety that the driver feels when changing the compression ratio in the hybrid vehicle. Another aspect of the present invention provides an apparatus and a method for controlling a variable compression ratio engine improving a driving stability of a vehicle when changing a compression ratio of an engine through a variable compression ratio apparatus in a hybrid vehicle.

An apparatus for controlling a variable compression ratio engine according to an embodiment of the present invention includes a piston reciprocal moving in a cylinder of an engine; a variable compression ratio apparatus controlling a movable range of the piston; and a controller controlling the variable compression ratio apparatus if a driving condition of a vehicle and a stability condition of the engine are satisfied to change a compression ratio and controlling a motor torque and an engine torque to control a requirement torque to be satisfied.

A driving condition of the vehicle may be satisfied if an operating point of the engine is existed in a predetermined range, a vehicle speed is a predetermined speed or more, and a speed stage is a predetermined speed stage or more.

A stability condition of the engine may be satisfied if an atmospheric pressure is a predetermined pressure or more, a driving time of the vehicle of the engine starting is a predetermined time or more, a fuel temperature is a predetermined temperature or less, a coolant temperature is a predetermined temperature or more, the engine torque is within a predetermined range during a predetermined time, an engine speed is within a predetermined range during a predetermined time, an air amount inflowing to the cylinder is within a predetermined range during a predetermined time, a driving mode is not a generation mode of an exhaust gas processing device, and a predetermined time is exceed after the compression ratio change is executed through the variable compression ratio apparatus.

If the SOC (state of charge) of the battery is a predetermined value or more, the controller may control the engine with an idle stage and controls the requirement torque to be satisfied through the motor torque.

If the SOC (state of charge) of the battery is less than a predetermined value, the controller may control a motor torque to be a maximum output in a current SOC level, a difference of the requirement torque and the motor torque to be compensated through an engine torque determined within an optimal operating curve.

A method for controlling a variable compression ratio engine according to another embodiment of the present invention adjusting a movable range of a piston reciprocally moving in a cylinder through a variable compression ratio apparatus includes determining whether a driving condition of a vehicle and a stability condition of an engine are satisfied by a controller; operating the variable compression ratio apparatus to change a compression ratio by the controller if the driving condition of the vehicle and the stability condition of the engine are satisfied; and controlling a motor torque and an engine torque by the controller to control a requirement torque to be satisfied.

The driving condition of the vehicle may be satisfied if an operating point of the engine is existed in a predetermined range, a vehicle speed is a predetermined speed or more, and a speed stage is a predetermined speed stage or more.

The stability condition of the engine may be satisfied if an atmospheric pressure is a predetermined pressure or more, a driving time of the vehicle of the engine starting is a predetermined time or more, a fuel temperature is a predetermined temperature or less, a coolant temperature is a predetermined temperature or more, the engine torque is within a predetermined range during a predetermined time, an engine speed is within a predetermined range during a predetermined time, an air amount inflowing to the cylinder is within a predetermined range during a predetermined time, a driving mode is not a generation mode of an exhaust gas processing device, and a predetermined time is exceed after the compression ratio change is executed through the variable compression ratio apparatus.

The method for controlling the variable compression ratio engine according to another embodiment of the present invention may further includes determining whether a stage of charge (SOC) of a battery is predetermined value or more by the controller; and controlling a motor torque and an engine torque according to the SOC.

If the SOC (state of charge) of the battery is a predetermined value or more, the engine may be controlled with an idle state and the requirement torque is controlled to be satisfied through the motor torque.

If the SOC (state of charge) of the battery is less than a predetermined value, a motor torque may be controlled to be a maximum output in a current SOC level, a difference of the requirement torque and the motor torque is controlled to be compensated through an engine torque determined within an optimal operating curve.

According to the apparatus and the method for controlling the variable compression ratio engine according to an embodiment of the present invention, when changing the compression ratio of the engine in the hybrid vehicle, the operation of the engine may be minimized such that the incontinence that the driver feels may be solved, thereby improving a marketability of the vehicle.

BRIEF DESCRIPTION OF THE DRAWINGS

The drawings are provided for reference to explain an illustrative embodiment of the present invention, and the technical spirit of the present invention should not be interpreted to be limited to the accompanying drawings.

DETAILED DESCRIPTION OF THE EMBODIMENTS

Figure 1:
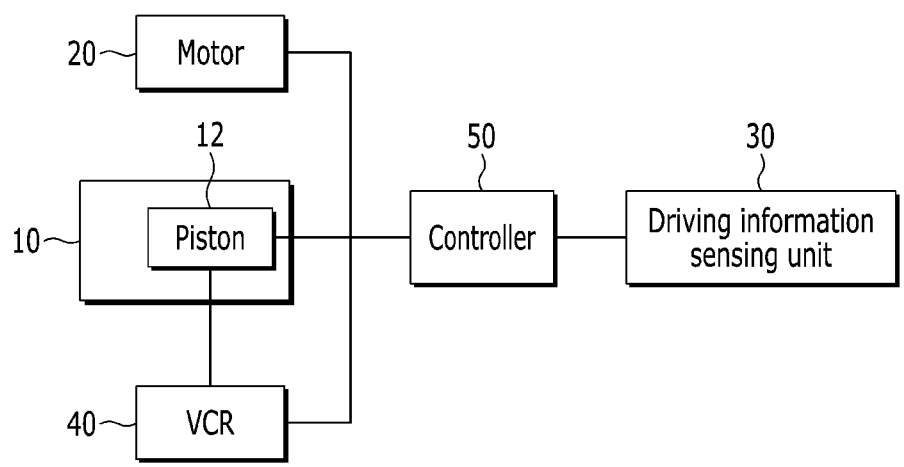
FIG. 1 is a schematic view showing a configuration of a control apparatus of a variable compression ratio engine according to an embodiment of the present invention.

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

The size and the thickness of each component illustrated in the drawings are arbitrarily illustrated in the drawings for better understanding and ease of description, but the present invention is not limited to the illustration. In the drawings, the thicknesses of various portions and regions are enlarged for clarity.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum).

Additionally, it is understood that the processes may be performed by one or plurality of controllers. It is understood that the term controller/control unit refers to a hardware device that includes a memory and a processor. The memory is configured to store the modules, and the processor is specifically configured to execute said modules to perform one or more processes which are described further below.

Furthermore, control logic according to embodiments of the present invention may be embodied as non-transitory computer readable media on a computer readable medium containing executable program instructions executed by a processor, controller/control unit, or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a Controller Area Network (CAN).

Hereinafter, an apparatus and a method for controlling a variable compression ratio engine according to an embodiment of the present invention will be described with reference to accompanying drawings.

In variable compression ratio engines, when changing the compression ratio of the engine through the variable compression ratio engine, the torque of the engine temporarily becomes unstable, and there are changes in combustion noise. Such a phenomenon brings a discomfort to the driver.

Particularly, when the compression ratio is changed from a low compression ratio to a high compression ratio, since the combustion noise is changed depending on the increasing of the explosion pressure of the engine and the combustion noise is large, the driver feels more anxiety and discomfort.

FIG. 1 is a schematic view showing a configuration of a vehicle that includes a control apparatus of a variable compression ratio engine according to an embodiment of the present invention.

In embodiments, the vehicle includes the variable compression ratio engine that includes a cylinder and a piston 12 executing a reciprocal motion within the cylinder of the engine 10. The vehicle further includes a motor generating a driving motor torque for operating the vehicle. As shown in FIG. 1, the vehicle includes a variable compression ratio apparatus 40 controlling a movable range of the piston 12 and one or more controllers 50 controlling operations of the engine 10 and the variable compression ratio apparatus 40.

The engine 10 includes a plurality of cylinders generating a driving torque by combustion of a fuel. The piston 12 reciprocally moves up and down within the cylinder and receives an expansion force of an intake gas to be transmitted to a connecting rod.

The variable compression ratio (VCR) apparatus 40 is mounted on an engine 10 and changes a compression ratio of the engine 10.

In embodiments, the variable compression ratio apparatus 40 may realize the variable compression ratio by controlling the movable range of the piston 12. In embodiments, the variable compression ratio apparatus 40 may use a typical one known to ordinary skilled in the art.

The motor receives a power source from a battery to assist the driving power of the engine 10. If necessary (e.g., in a case of a regenerative braking), the motor is operated as a generator to generate the power source and the generated power source is stored in the battery. A state of charge (SOC) representing a charge stage of the battery is detected by a SOC detecting unit and is transmitted to the controller 50.

In embodiments, when determined that a driving condition of the vehicle and a stability condition of the engine are satisfied, the controller 50 operates the variable compression ratio apparatus 40 so that the compression ratio is controlled to be changed, the motor torque and the engine torque are controlled to control the requirement torque of the driver to be satisfied.

For this, the controller 50 may be implemented by one or more processors operated by a predetermined program, in which the predetermined program is set to perform steps of the method for controlling a variable compression ratio engine according to an embodiment of the present invention.

The controller 50 may determine whether the driving condition of the vehicle is satisfied based on a driving information sensed through a driving information sensing unit 30.

The driving condition of the vehicle may be satisfied if an operating point of the engine determined by an engine speed and an engine torque is existed in a predetermined region, the vehicle speed is a predetermined speed (e.g., 30 kph) or more, and a speed state is a predetermined speed stage (e.g., a third speed stage).

For example, if the operating point of the current engine is existed in the high compression ratio region, the vehicle speed is 30 kph (Km per hour) or more, and the speed stage is the third speed stage, it may be determined that the driving condition of the vehicle to change the compression ratio from the low compression ratio to the high compression ratio is satisfied.

For this, the driving information sensing unit 30 may include an engine speed sensor sensing the speed of the engine, a torque sensor sensing the torque of the engine, a vehicle speed sensor sensing the vehicle speed, and a speed stage detecting unit.

Figure 3:
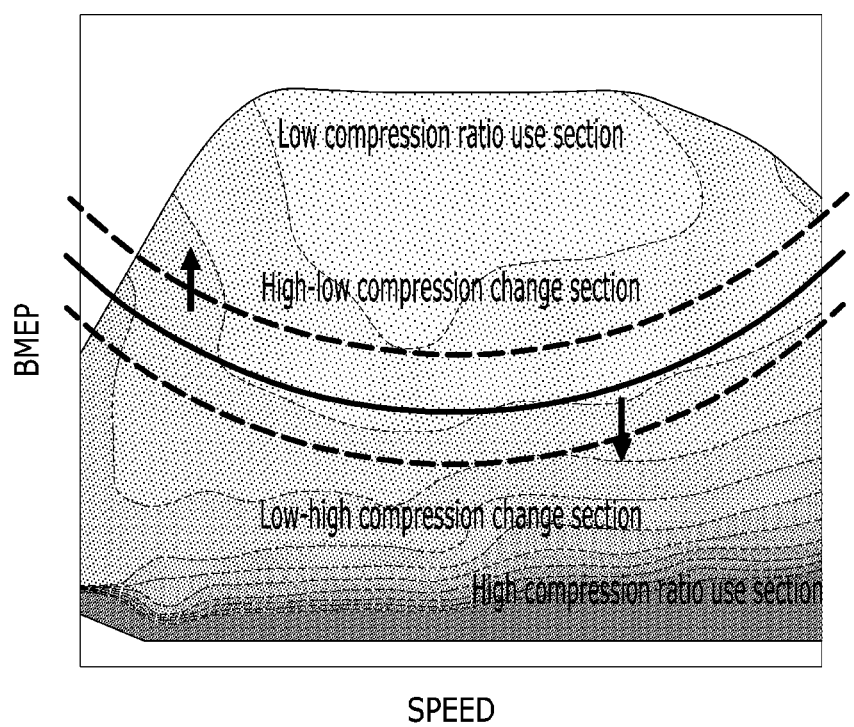
FIG. 3 is a graph showing a relation of an engine speed and a torque according to an embodiment of the present invention.

Referring to FIG. 3, a use section of the high compression ratio or the low compression ratio, a change section from the high compression ratio to the low compression ratio, and a change section from the low compression ratio to the high compression ratio are shown according to the engine speed and the engine torque. In embodiments, the current engine operating point may be determined through the operating point map shown in FIG. 3, and it may be determined where the position of the current operating point of the engine is in the high compression ratio use section, or the low compression ratio use section.

Also, the controller 50 may determine whether the stability condition of the engine is satisfied based on the driving information sensed through the driving information sensing unit 30.

The stability condition of the engine may be satisfied if an atmospheric pressure is a predetermined pressure (e.g., 800 hPa) or more, a driving time after the engine starting is a predetermined time (e.g., 60 seconds) or more, a fuel temperature is a predetermined temperature (e.g., 70 degree Celsius) or less, a coolant temperature is a predetermined temperature (e.g., 60 degree Celsius) or more, the engine torque is within a predetermined range (e.g., 20 Nm) during a predetermined time (e.g., 0.5 seconds), the engine speed is within a predetermined range (e.g., 50 RPM) during a predetermined time (e.g., 0.5 seconds), an air amount inflowing to the cylinder is within a predetermined range (e.g., 30%) during a predetermined time (e.g., 0.5 seconds), a driving mode is not a regeneration mode of an exhaust gas processing apparatus (e.g., a DeNOx mode, a DeSOX mode, or a DPF regeneration mode), and a predetermined time (e.g., 3 seconds) is exceeded after the compression ratio change is executed through the variable compression ratio apparatus 40.

Among the stability conditions of the engine, the atmospheric pressure, the driving time of the vehicle after the starting, the fuel temperature, and the coolant temperature are used to determine whether the external condition is satisfied and the engine is sufficiently pre-heated.

Among the stability conditions of the engine, the engine torque, the engine speed, and the air amount may be used to prevent the compression ratio of an excessive transition region (e.g., a case that the vehicle suddenly accelerates or suddenly decreases) from being changed.

Among the stability conditions of the engine, the driving mode may be used to prevent the compression ratio from being changed when the generation mode for the generation of the exhaust gas processing apparatus enters.

Finally, among the stability conditions of the engine, the predetermined time after the compression ratio change is executed through the variable compression ratio apparatus 40 may be used to prevent or inhibit parts configuring the variable compression ratio apparatus 40 from being overloaded as the compression ratio change is frequently executed through the variable compression ratio apparatus 40. Accordingly, the compression ratio change is not again tried even if the compression ratio change is not done during the predetermined time (e.g., 3 seconds) after the compression ratio change is executed through the variable compression ratio apparatus 40.

To determine the stability condition of the engine, the driving information sensing unit 30 may include an atmospheric pressure sensor sensing an atmospheric pressure, a timer, a fuel temperature sensor sensing a fuel temperature, a coolant temperature sensor sensing a coolant temperature, an engine speed sensor sensing the speed of the engine, a torque sensor sensing the torque of the engine, and an air flow rate sensor (e.g., an air flow sensor) sensing an air flow rate. The driving information sensed in the driving information sensing unit 30 is transmitted to the controller 50.

Hereinafter, the method for controlling the variable compression ratio engine and the motor for operating the vehicle according to an embodiment of the present invention is described with reference to accompanying drawings.

Figure 2:
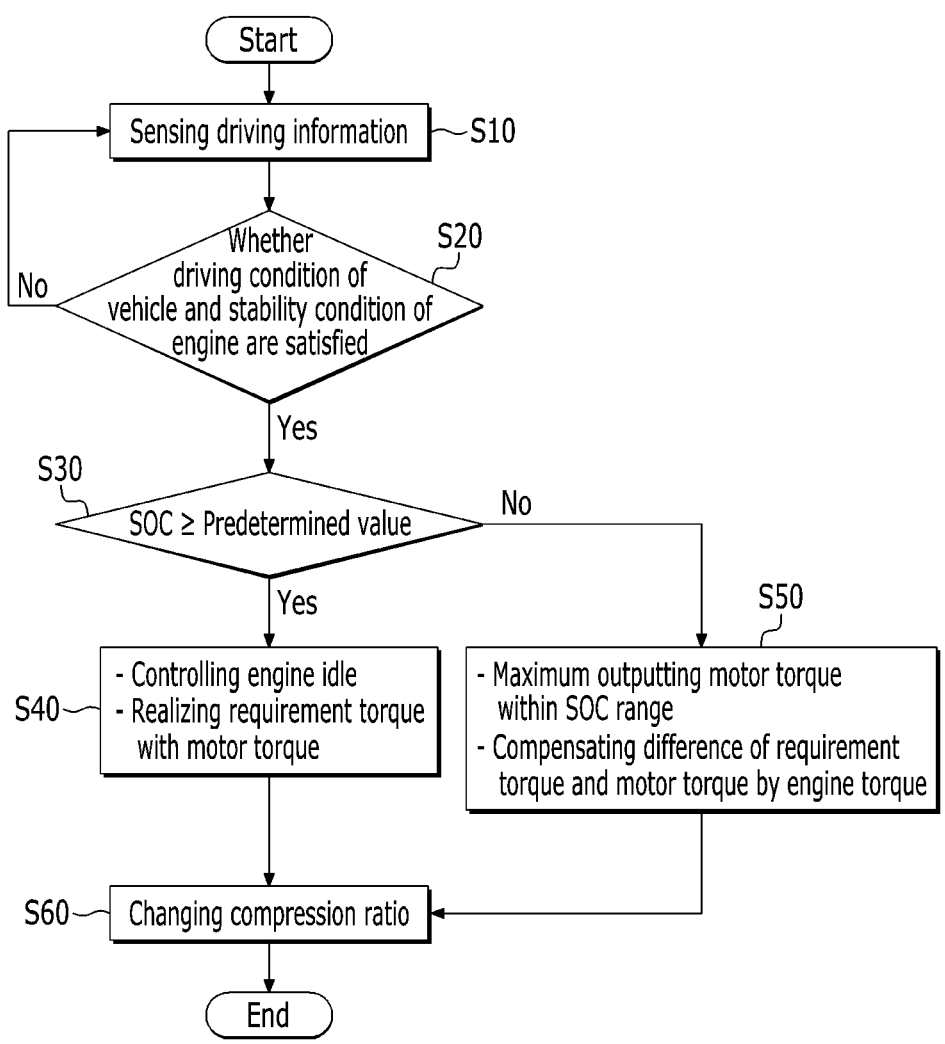
FIG. 2 is a flowchart showing a control method of a variable compression ratio engine according to an embodiment of the present invention.

FIG. 2 is a flowchart showing a method for controlling a variable compression ratio engine according to an embodiment of the present invention.

As shown in FIG. 2, during the driving of the vehicle, the driving information sensing unit 30 senses the driving information for determining the driving condition of the vehicle and the stability condition of the engine (S10) and transmits the sensed driving information to the controller 50.

The controller 50 determines whether the driving condition of the vehicle and the stability condition of the engine are satisfied based on the driving information sensed in the driving information sensing unit 30 (S20). The method for determining whether the driving condition of the vehicle and the stability condition of the engine are satisfied is the same as the above-described such that the repeated description is omitted.

If the driving condition of the vehicle and the stability condition of the engine are satisfied, the controller 50 determines whether the SOC (state of charge) of the battery is the predetermined value (e.g., 40%) or more (S30). That the SOC of the battery is the predetermined value or more may be that the requirement torque of the driver is possible to be satisfied with the motor torque output from the motor.

If the SOC of the battery is the predetermined value or more, the controller 50 controls the engine to be driven with the idle state, controls the engine and the motor so that the requirement torque of the driver is satisfied by the motor torque output from the motor (S40), and changes the compression ratio of the engine through the variable compression ratio apparatus 40 (S60).

Figure 4:
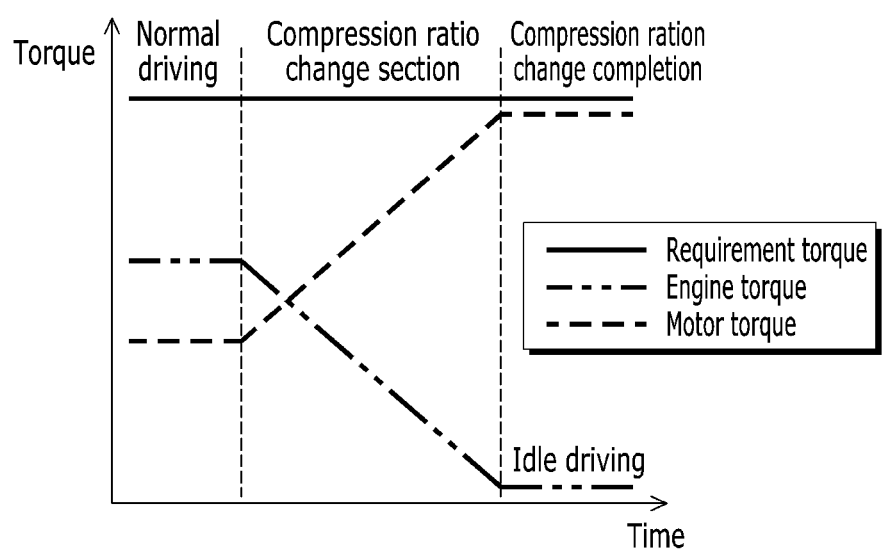
FIG. 4 is a view for explaining a method realizing a requirement torque when a torque of a motor according to an embodiment of the present invention is sufficient.

As shown in FIG. 4, in the case that the SOC of the battery is the predetermined value or more, as the requirement torque is satisfied only with the motor torque and the engine is driven with the idle state, the combustion noise change due to the instability of the engine torque is not generated when changing the compression ratio. Accordingly, it is possible to prevent the driver from feeling inconvenienced.

In embodiments, the requirement torque of the driver may be sensed through an accelerator pedal sensor (APS) sensing the position of an accelerator pedal provided on the vehicle.

If the SOC of the battery is less than the predetermined value, the controller 50 controls the motor torque to be the maximum output in the current SOC level and a difference of the requirement torque and the motor torque to be compensated through the engine torque determined within an optimal operating curve line (S50), and changes the compression ratio of the engine through the variable compression ratio apparatus 40 (S60).

Figure 5:
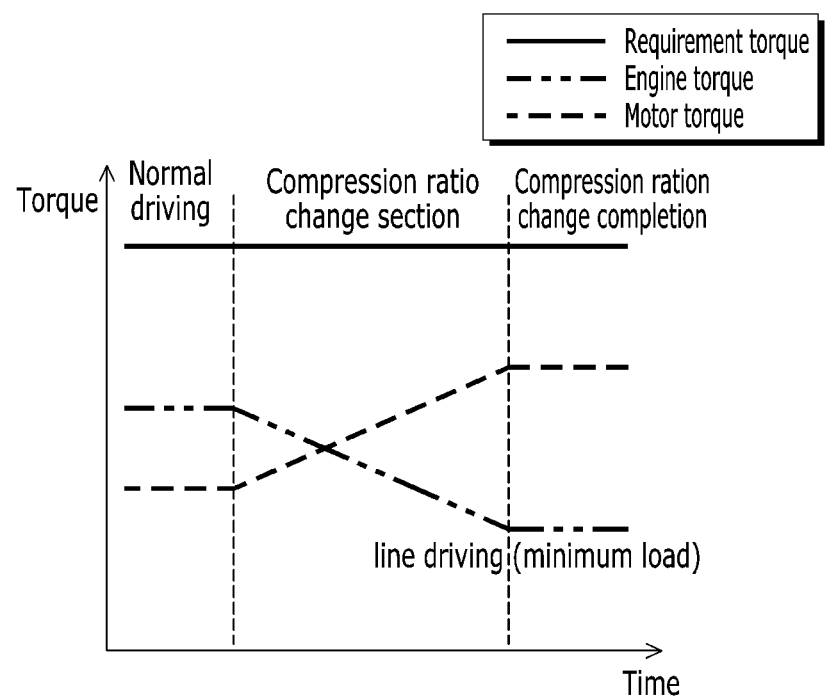
FIG. 5 is a view for explaining a method realizing a requirement torque when a torque of a motor according to an embodiment of the present invention is insufficient.

As shown in FIG. 5, when the SOC of the battery is less than the predetermined value, since it is difficult to satisfy the requirement torque only with the motor torque, the motor torque is controlled to be the maximum output within the SOC range of the battery, and the torque corresponding to the difference of the requirement torque and the motor torque is controlled to be output through the engine torque, thereby the requirement torque is controlled to be satisfied.

In embodiments, as the engine torque is controlled to be determined on the optimal operating curve, the inconvenience of the driver generated due to the engine torque change generated when changing the compression ratio and the combustion noise change due thereto may be minimized by minimizing the operation of the engine.

According to the apparatus and the method for controlling the variable compression ratio engine according to an embodiment of the present invention, as the engine operation may be minimized during the compression ratio change, the inconvenience that the driver feels due to the change of the engine torque generated in a moment during the compression ratio change and the combustion noise due thereto may be prevented.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: engine
12: piston
30: driving information sensing unit
40: variable compression ratio apparatus
50: controller

What is claimed is:

1. A vehicle apparatus comprising:
    a variable compression engine comprising a cylinder and a piston that is configured to reciprocally move in the cylinder;
    a variable compression ratio apparatus configured to adjust a movable range of the piston; and
    at least one controller configured to cause the variable compression ratio apparatus to change a compression ratio when determined that a driving condition of a vehicle and a stability condition of the engine are satisfied to change a compression ratio and further configured to control a motor and the engine to adjust a motor torque and an engine torque to meet a torque requirement for operating the vehicle,
    wherein a stability condition of the engine is satisfied if an atmospheric pressure is a predetermined pressure or more, a driving time of the vehicle of the engine starting is a predetermined time or more, a fuel temperature is a predetermined temperature or less, a coolant temperature is a predetermined temperature or more, the engine torque is within a predetermined range during a predetermined time, an engine speed is within a predetermined range during a predetermined time, an air amount inflowing to the cylinder is within a predetermined range during a predetermined time, a driving mode is not a generation mode of an exhaust gas processing device, and a predetermined time is exceed after the compression ratio change is executed through the variable compression ratio apparatus.

2. The vehicle of claim 1, wherein a driving condition of the vehicle is satisfied if an operating point of the engine exists in a predetermined range, a vehicle speed is a predetermined speed or more, and a speed stage is a predetermined speed stage or higher.

3. The vehicle of claim 1, wherein, If the SOC (state of charge) of the battery is a predetermined value or more, the controller is configured to control the engine with an idle stage and control the requirement torque to be satisfied through the motor torque.

4. The vehicle of claim 1, wherein if the SOC (state of charge) of the battery is less than a predetermined value, the controller is configured to control a motor torque to be a maximum output in a current SOC level, a difference of the requirement torque and the motor torque to be compensated through an engine torque determined within an optimal operating curve.

5. A method for controlling a variable compression ratio engine and a motor of a vehicle, the method comprising:
    determining whether a driving condition of a vehicle and a stability condition of an engine are satisfied by a controller;
    operating a variable compression ratio apparatus to change a compression ratio of the engine, when determined that the driving condition of the vehicle and the stability condition of the engine are satisfied; and
    controlling a motor and the engine to adjust a motor torque and an engine torque such that a torque requirement for operating the vehicle is satisfied, wherein the stability condition of the engine is satisfied if an atmospheric pressure is a predetermined pressure or more, a driving time of the vehicle of the engine starting is a predetermined time or more, a fuel temperature is a predetermined temperature or less, a coolant temperature is a predetermined temperature or more, the engine torque is within a predetermined range during a predetermined time, an engine speed is within a predetermined range during a predetermined time, an air amount inflowing to the cylinder is within a predetermined range during a predetermined time, a driving mode is not a generation mode of an exhaust gas processing device, and a predetermined time is exceed after the compression ratio change is executed through the variable compression ratio apparatus.

6. The method for controlling the variable compression ratio engine of claim 5, wherein the driving condition of the vehicle is satisfied if an operating point of the engine exists in a predetermined range, a vehicle speed is a predetermined speed or more, and a speed stage is a predetermined speed stage or higher.

7. The method for controlling the variable compression ratio engine of claim 5, further comprising:
determining whether a stage of charge (SOC) of a battery is predetermined value or more by the controller; and
controlling a motor torque and an engine torque according to the SOC.

8. The method for controlling the variable compression ratio engine of claim 7, wherein if the SOC (state of charge) of the battery is a predetermined value or more, the engine is controlled with an idle state and the requirement torque is controlled to be satisfied through the motor torque.

9. The method for controlling the variable compression ratio engine of claim 7, wherein if the SOC (state of charge) of the battery is less than a predetermined value, a motor torque is controlled to be a maximum output in a current SOC level, a difference of the requirement torque and the motor torque is controlled to be compensated through an engine torque determined within an optimal operating curve.

* * * * *